Nov. 18, 1958    J. N. LAYCOCK    2,860,593
AMPHIBIOUS CRAFT
Filed Jan. 19, 1954    3 Sheets-Sheet 1

INVENTOR.
John N. Laycock
BY
Kenway, Jenney, Witter & Hildreth

Nov. 18, 1958     J. N. LAYCOCK     2,860,593
AMPHIBIOUS CRAFT
Filed Jan. 19, 1954     3 Sheets-Sheet 2
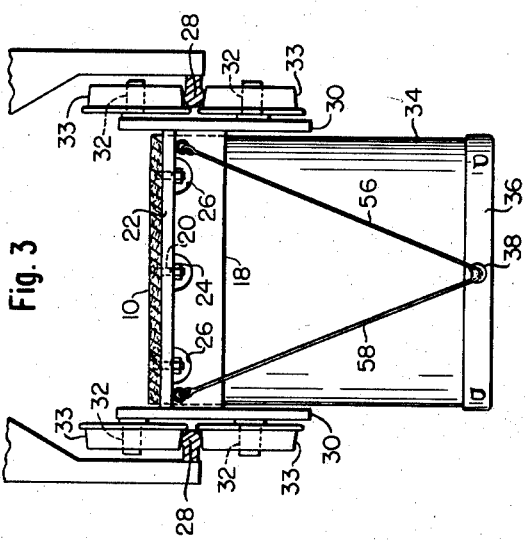
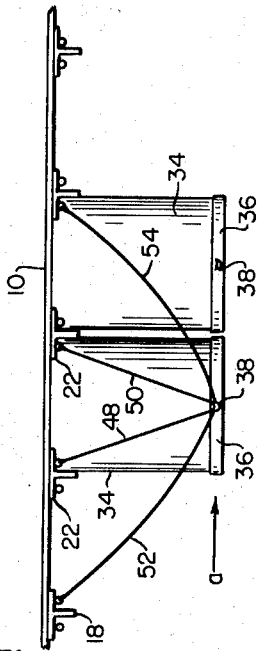
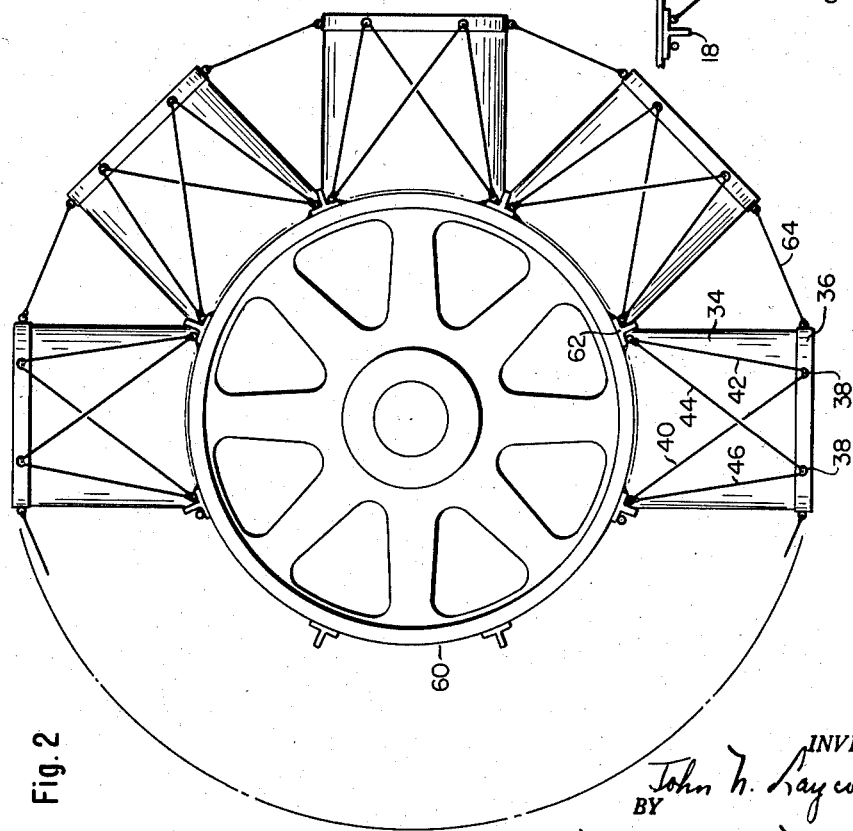
INVENTOR.
John N. Laycock
BY
Kenway, Jenney, Witter & Hildreth

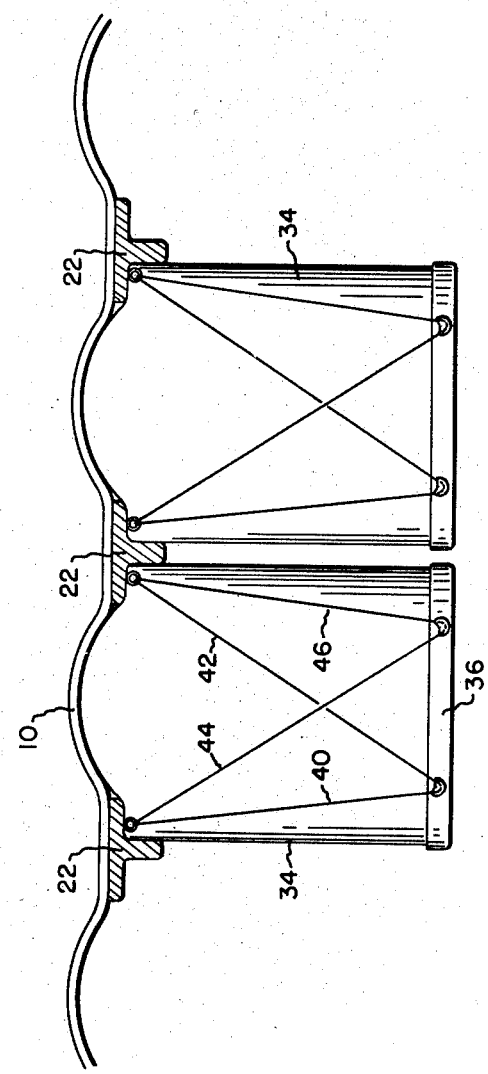

2,860,593

AMPHIBIOUS CRAFT

John N. Laycock, Derry, N. H.

Application January 19, 1954, Serial No. 404,965

9 Claims. (Cl. 115—1)

The present invention relates to amphibious vehicles and in particular to a combination float and tread adapted to support and propel an amphibious vehicle on land and in water.

Amphibious craft in use today have an abundance of elements capable of performing a useful function in only one of the vehicle's intended environments. For example, apparatus provided to sustain and propel an amphibious vehicle in water perform no useful purpose and often interfere with the operation of other elements when the vehicle is employed on land. Moreover, the means provided to drive the craft on land merely add weight to the craft and make more difficult the task of floating it.

The most important object of my invention, therefore, is to provide conveniently operable and relatively simple means for propelling and supporting an amphibious vehicle.

Another object of this invention is to provide relatively inexpensive means for stiffening the support and propelling means against stresses of various kinds.

In accomplishing these and other objects I provide as one important feature of this invention a plurality of inflatable cylindrical floats or treads mounted about a traveling belt, which serve to float the vehicle when in water and to drive the vehicle when on land.

Another important feature of this invention resides in the provision of a harness fastened to the floats or treads to resist deformation of their cylindrical configuration under lateral forces exerted against the floats.

These and other objects and features of this invention will be more readily understood and appreciated from the following detailed description of preferred embodiments thereof, selected for purposes of illustration and shown in the accompanying drawings, in which:

Fig. 2 is a view in side elevation of another form of combination float and tread constructed in accordance with this invention.

Fig. 3 is a view in section taken along section line 3–3 of Fig. 1,

Fig. 4 is a fragmentary view in side elevation of another form of combination float and tread constructed in accordance with this invention, and Fig. 5 is an enlarged fragmentary view in side elevation of a combination float and tread constructed in accordance with this invention.

Figure 1:
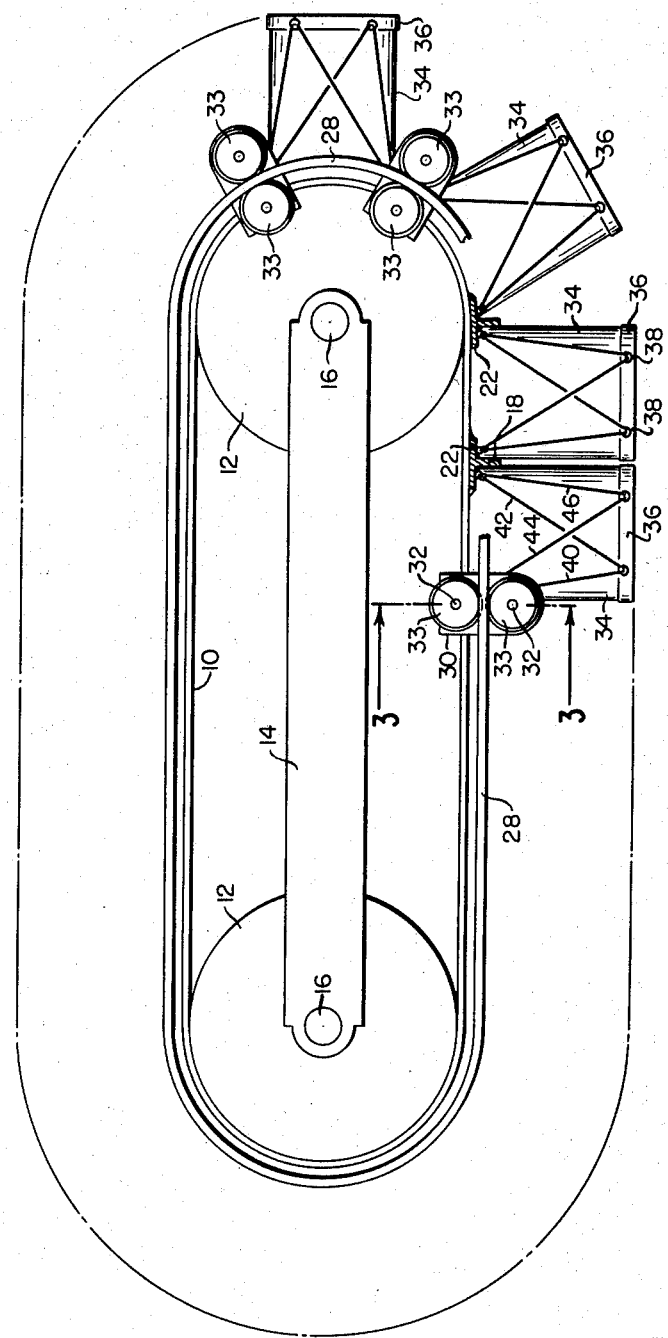
Fig. 1 is a view in side elevation of one form of combination float and tread constructed in accordance with this invention.

Proceeding now to a detailed description of this invention, a float and tread assembly of the type illustrated in Fig. 1 will be employed on each side of an amphibious vehicle in the manner of tracks on a military tank. By reference to Fig. 1 it may be seen that the combination float and tread comprising this invention is organized about an endless belt 10 and pulleys 12.

A rigid metal spacer 14 mounted along each side of the body of a craft embodying this invention maintains a constant distance between the pulleys. An endless belt 10 is arranged on the pulleys at each side of the craft and may be constructed of a rubberized material, and additional strength for the belt may be acquired by the use of steel cable reinforcements. To drive the pulleys a power source (not shown) having a power rating determined by the size of the vehicle may be operatively connected to the shafts 16.

Longitudinally spaced along the outer surface of the belt 10 are a plurality of T-shaped axles 18 secured thereto by bolts 20 and nuts 24. To permit the belt to pass smoothly over the pulleys the bolts 20 pass through the center of the body of the axle with the bolt heads embedded in the under surface of the belt. Semi-circular recesses 26 in the body of the axle receive the nuts 24.

To support the belt 10 through its horizontal runs and to carry a major portion of the load exerted on the belt during operation, a pair of tracks 28 are positioned adjacent the ends of the axles and describe an endless course similar to the run of the belt. Similar tracks will be positioned adjacent the ends of the axle disposed on the other belt on the opposite side of the vehicle. Face plates 30 secured as by welding perpendicular to the axle on the ends thereof serve as supports for stub shafts 32. The stub shafts 32 carry on their free ends single flanged wheels 33 positioned to engage the upper and lower surfaces of the track 28. The pairs of wheels engaging each track will, in addition to supporting a major part of the load on the belt, stabilize the belt and resist lateral displacement thereof.

A plurality of inflated bags 34 are positioned about the outer surface of the belt and serve as treads and pontoons for the amphibious vehicle. The bags 34 are cylindrical in shape and may be made of 16-ounce canvas. Within each bag is a rubber bladder (not shown) which serves as an inner tube to retain air under pressure. Suitable means (not shown) are provided to inflate the bladder. The bags 34 are placed axially perpendicular to the belt and engage the surface thereof between adjacent axles 18. In the preferred embodiment of this invention the bags are not directly fastened to the belt but are secured to the axles 18 by harnesses later to be described. The bags 34 which may be approximately two feet in diameter and three feet in height are closely spaced about the belt's entire outer surface. The invention does not depend for operability upon the size of the bags employed but the size used will be dictated by the weight and other physical characteristics of the vehicle.

Before proceeding to the description of the means employed for securing the bags 34 to the axles 18, a brief inspection of the physical characteristics of an inflated member of the type here employed is deemed helpful. It is well known that a non-rigid inflated member is particularly suited to withstand great amounts of compressive forces without appreciable deformation. This is true although little more than atmospheric pressure is maintained within the member. On the other hand, inflated flexible objects lack the capacity to resist laterally applied forces against its walls. Specifically, bags of the type herein described offer little resistance to lateral forces exerted against the ends thereof. Under such forces the bags will readily deform and this is particularly undesirable for a vector representing the lateral force of the earth against the tread bag is sizable when the vehicle is driven on land. Because of this fact, the form of the harness which serves to secure the individual bags to the axles is particularly important. The ropes or cables comprising the harness need not assist the bags in withstanding compressive forces, and little support is necessary to counteract any tension applied to the cylindrical walls thereof, for the forces applied by their nature exert little stress of this type on them.

Proceeding now with a detailed description of the means employed to secure the tread bags to the axles, mounted over the outer end of each bag is a tread cap or shoe 36 of strong abrasion resisting material. The shoes or caps may be integrally constructed with the bags 34 or may be separately manufactured and telescopically fit over the bags' outer ends. The cap or shoe 36 will substantially eliminate direct engagement of the canvas fabric of the bags with the ground, greatly reducing the possibility of bag rupture. Provided about the flange of the shoes 36 are a plurality of clamps 38 which serve as anchoring means for the harness. A pair of ropes 40, 42 and 44, 46 are secured at their midsections to the clamps 38 and engage the axles 18 on each side of the bag. The ropes forming part of the bag harness are strong in tension, compressing the bag against the belt. To provide room for the bags to expand under the barreling stress of the air pressure within their bladders, a small space is left between adjacent bags as is seen in the drawings.

If lateral force is applied to the bags 34 longitudinally of the belt 10 the segments of each of the ropes inclined in the direction of the applied force will act to oppose deformation of the bag under the applied force, while the tension of the segments of the rope inclined against the direction of the force will be reduced or totally eliminated. The resistance offered by the segments of the rope will be determined by the ropes inclination; that is, as the ropes inclined in the direction of force approach a position parallel to the direction of the applied force, they will more readily resist deformation of the bag.

Fig. 4 is an illustration of one embodiment of this invention which employs directly such a principle. If for any reason it is desired to offer little resistance to a small amount of deformation, that is, to permit slight changes in shape, rope 48, 50 may be strung in tension to form an equalateral triangle with its base defined by adjoining axles, while a second rope 52, 54 is secured at its ends to axles removed from the axles immediately adjacent the bag. As illustrated, the rope 52, 54 is not in tension and will offer no resistance initially to an applied lateral force. If a force is exerted against the bag in the direction of the arrow "a," initially, only the segment 48 of the rope 48, 50 will resist deformation. After the cap has been displaced to the right and segment 52 of the rope 52, 54 is placed in tension, a great deal of resistance will oppose further displacement of the cap, for the angle of inclination of the segment 52 is smaller than that of segment 48.

It is understood that the part of the harness thus far described has its full equivalent on the opposite side of the bag. Running laterally of the belt 10 on the leading and trailing sides of the tread bag 34 are additional ropes which complete the harness structure. As shown in Fig. 3, laterally positioned across the belt 10 is a rope 56, 58 fastened at its ends to the ends of the T bar axle 18. The rope 56, 58 is fastened at its midpoint to another clamp 38 on the shoe 36 and will resist deformation of the bag 34 under forces applied across the belt 10. Obviously the preponderance of the lateral forces will be longitudinal of the belt 10 and therefore greater support is necessary to resist deformation in that direction; hence the need for at least two ropes longitudinal of the belt and merely one rope laterally thereof.

Before proceeding to a description of other embodiments of this invention, additional descriptive matter directed particularly to the belt 10 is deemed necessary. A frictional grip between the belt and the pulley is necessary to transmit the driving force and this grip normally is created by the tension in the belt as it is stretched over the pulleys. However, too much tension on the belt is objectionable because it may put an excessive load on the belt, pulleys and pulley mountings; and if it gets too large it may damage them. Therefore, elastically maintaining the belt or chain snug on the pulleys is desirable.

Within limits, belt tension is commonly kept at a suitable level by periodic take-up of the distance between pulley centers, or by idler take-up. In addition, some automatic take-up commonly is needed to absorb the small changes in belt length which occur more or less continually under the influence of changing moisture content and temperature, and due to wear and tear, repeated stressing, and age. This automatic take-up commonly operates in the long catenaries in which the belt is suspended between pulleys. Due to the cutting of the usual long catenary between pulleys into a number of short catenaries between axles I have greatly increased the amount of the change in belt tension which will occur as a result of a given change in belt length. If nothing is done to counter this new sensitivity my axle-guided belt may go from a tension too low to provide driving friction, to a tension so great that it will break the pulley axles, with the small daily fluctuations in belt length.

My invention in its preferred form, employs the end reaction of each inflated pontoon to impress a deeper catenary in the belt than otherwise would exist between the adjacent axles. The belt is put under tension by drawing the harness of each pontoon taut enough to crush the pontoon endwise against the belt, to provide a loading on the catenary causing increased tension in the belt as it suspends this applied load between the adjacent axles. The pontoons distort themselves slightly to fit the curve of the catenary. Each pontoon applies an air-cushioned force to the catenaries, and through them to the belt as a whole, thus creating an adequate tension to keep the belt hugging the pulleys with a drivable grip, and to absorb slack or yield it up in the catenaries to adjust to the shrinking and stretching of the belt which occurs in more or less continuous cycles.

Thus far the description of the invention has been limited to the illustrated embodiments. However, numerous variations will immediately occur to one skilled in the art to which the invention pertains. For example, although the harness has been described as a rope construction, light wire may be substituted. Moreover, the size of the vehicle and its intended maximum speed and the type of terrain upon which it is to be used may require the use of additional ropes to form the harness for each of the inflated tread bags. It would be within the spirit of this invention to increase greatly the number of ropes employed. For example in addition to ropes 40, 42 and 44, 46 a number of other ropes may be added to the sides of the bags 34. If very heavy duty is intended for the vehicle, the harness may assume the configuration of a net-like basket.

An integrated tread of laminated construction may combine the casing, bladder, and shoe in a single integral unit similar to a tubeless bicycle tire. Stabilizing harnesses of the kinds shown and described above may be located largely inside such a unit and integrated with it. The risk of snagging the ropes of the harness is greatly reduced by the protection furnished by the walls of the bag itself. Moreover, this integrated construction may prove to require fewer ropes than would be needed externally of the bag to produce a desired degree of stability.

For example, ropes 40—42, 44—46, 48—50 and 52—54 may be conveniently secured in position within the bag. The intermediate portion of each rope may be secured to the outer end of the bag along a line parallel to the center line of the belt, with the ends of the rope extending to the midpoints of adjacent axles. Ropes secured in this fashion will lie in a plane perpendicular to and passing through the center line of belt 10. Lateral support may be furnished by securing rope 56—58 within the bag in a plane perpendicular to the plane of the longitudinal force opposing ropes.

An alternative arrangement may be employed which does away with the need of separate lateral ropes such as 56—58. Ropes 40—42, 44—46 and 48—50 may be secured intermediate their ends to points on the longitudinal center line of the outer end of the bag, while the ends of the ropes extend to the ends of the axle. They will define planes having end views which appear as ropes 56—58 in Fig. 3. To employ this method, a portion of each rope would pass through the walls of the bag.

These internal harness ropes will require shoes of sufficient rigidity and strength to take the rope reactions which are applied to the shoes. The ropes may pass through the wall of the tread for attachment to the axle outside the tread and suitable fittings will be built into these walls adapted to maintain the airtight integrity of the walls and to transmit the tensile forces in the ropes through the wall.

The embodiment of this invention shown in Fig. 2 illustrates the use of the inflated bags 34 on a rotating surface in the shape of rigid metal wheel 60. T-shaped axles 62 of the type previously described are longitudinally spaced about the outer surface of the wheel frame 60. However, it is not necessary to employ the additional strengthening means comprising the tracks 28 and wheels 33. The wheel frame 60 may be constructed of high grade steel, and additional support means would not aid in its operation. The harness for retaining the bag on the wheel may be identical to the harness employed in the preferred embodiment illustrated in Figs. 1 and 3. However, tangental ties 64 may be employed to counteract the centrifugal force acting on the bags as they travel about their course.

From the foregoing description, it will be seen that a single tread bag may be replaced without disturbing any of the other bags. If a rupture occurs the harness securing the ruptured bag to the belt or wheel may be removed and a new bag may be substituted for the defective one. It is unnecessary to dismount the bags adjacent the one to be removed for each bag is independently secured to the traveling surface.

In operation, a combination float and tread asembly would be disposed on each side of an amphibious craft. In water the inflated bags would sustain the vehicle and further may be used as paddles to propel the vehicle along a desired course. On the other hand the inflated bags may be used to support and propel the vehicles when used on land in the manner of a tire on the common automobile or a track on a military tank. Efficient operation will be obtained from the assembly in performing the driving and supporting function without a multiplicity of duplicate elements and the overall weight of the craft is appreciably reduced.

Having thus described in detail the preferred embodiments of this invention and suggested a few modifications thereof, it will be appreciated by those skilled in the art that other modifications may be made without departing from the spirit of the invention.

What I claim as new and desire to secure by Letters Patent of the United States is:

1. An amphibious propelling device comprising an endless traveling surface, a plurality of individually inflatable members mounted on said surface, axles extending across and secured to the traveling surface and disposed between each of the inflatable members, and stabilizing means fastened to each of said inflatable members and the adjacent axles securing the members to the surface and opposing deformation of said members, the stabilizing means lying in planes substantially normal to the traveling surface and being in tension to compress the inflatable members against the surface.

2. An amphibious propelling device comprising an endless traveling surface, a plurality of individually inflatable cylindrically shaped members disposed on said surface axially perpendicular thereto, axles extending across and secured to the traveling surface and disposed between each of the members, and stabilizing means fastened to each of said members and the adjacent axles securing the members to the surface and opposing deformation of said members, the stabilizing means lying in planes substantially perpendicular to the traveling surface and being in tension to compress the inflatable members against the surface.

3. An amphibious propelling device comprising an endless traveling surface, a plurality of non-rigid cylindrical members axially disposed perpendicular to said surface, fastening means secured to the surface between each of the cylindrical members, and a plurality of tensional stabilizers for each of said members connected to the outer ends of the members and diverging to the fastening means positioned on each side of the members compressing the members against the surface.

4. An amphibious propelling device comprising an endless flexible belt, a plurality of spaced apart axles laterally mounted on the outer surface of said belt, non-rigid cylindrical members perpendicularly disposed between each of said axles on the surface of said belt, and a harness for each of said members connected to adjacent axles and the intermediate member for securing the member to the belt and opposing deformation of said member, the harness being in tension compressing the members against the surface of the flexible belt.

5. An amphibious propelling device comprising an endless flexible belt, a plurality of spaced apart axles laterally mounted on the outer surface of said belt, inflatable cylindrical pontoons perpendicularly disposed on the surface of said belt between each of said axles, a rigid shoe mounted over the outer end of each of said pontoons, and a harness connected to adjacent axles and engaging the shoe of the intermediate pontoon to secure the pontoon in its operating position, the harness being in tension compressing the pontoons against the surface of the flexible belt.

6. An amphibious propelling device comprising an endless flexible belt, a pair of spaced apart pulleys defining the path of travel of said belt, a plurality of axles longitudinally spaced about the entire surface of said belt, an endless track positioned adjacent each side of said belt defining a path similar to the path of travel of said belt, a pair of wheels mounted on each end of said axles engaging the tracks, a plurality of inflated tread bags disposed on the surface of said belt intermediate adjacent axles, and harnesses secured to adjacent axles and the intermediate tread bags to secure said bags in position.

7. An amphibious propelling device as defined in claim 6 further characterized by said harnesses being connected in tension between said axles and intermediate bag compressing the bags against said flexible belt causing said belt to sag between axles below said bags, said sag being adapted to absorb stretching and shrinking of said belt thereby reducing variations in belt tension about the pulley.

8. An amphibious propelling device as defined in claim 6 wherein said harnesses each comprise a shoe mounted on the free end of said tread bags, a plurality of ties, the ends of each of said ties being secured to adjacent axles and the intermediate portion of said ties being secured to the intermediate shoe, and an additional tie secured at its ends to the ends of an axle and the intermediate portion of said tie secured to a shoe on an adjacent tread bag, all of the ties lying in planes perpendicular to the surface of the belt.

9. An amphibious propelling device comprising a rigid wheel, a plurality of longitudinally spaced T-bars connected about the surface of said wheel, a plurality of non-rigid inflated cylindrical tread bags positioned axially perpendicular to the surface of said wheel between said bars, a shoe mounted on the outer end of each of said bags, and harnesses connecting the shoes to the adjacent bars to secure said bags to said wheel and oppose lateral forces applied to said bags, and harnesses being in tension and defining planes perpendicular to the surface of the wheel compressing the bags against the surface thereof.

References Cited in the file of this patent

UNITED STATES PATENTS

| | | |
|---|---|---|
| 1,275,134 | Colle | Aug. 6, 1918 |
| 1,310,746 | Firestone | July 22, 1919 |
| 1,750,478 | Koehler | Mar. 11, 1930 |
| 2,494,445 | Moeller | Jan. 10, 1950 |

FOREIGN PATENTS

| | | |
|---|---|---|
| 810,806 | France | Jan. 6, 1937 |